United States Patent
Hamatsu

(10) Patent No.: US 7,472,123 B2
(45) Date of Patent: Dec. 30, 2008

(54) SERVER DEVICE, COMMUNICATION DEVICE, AND PROGRAM FOR MANAGING CONTENTS USAGE

(75) Inventor: Makoto Hamatsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 286 days.

(21) Appl. No.: 10/505,986

(22) PCT Filed: Feb. 27, 2003

(86) PCT No.: PCT/JP03/02196

§ 371 (c)(1),
(2), (4) Date: Aug. 25, 2004

(87) PCT Pub. No.: WO03/075599

PCT Pub. Date: Sep. 12, 2003

(65) Prior Publication Data

US 2005/0165711 A1    Jul. 28, 2005

(30) Foreign Application Priority Data

Mar. 5, 2002 (JP) .............................. 2002-107155

(51) Int. Cl.
*G06F 7/00* (2006.01)
(52) U.S. Cl. ............................. 707/9; 707/10; 707/204
(58) Field of Classification Search .................. 707/9, 707/204, 10, 104.1
See application file for complete search history.

(56) References Cited

U.S. PATENT DOCUMENTS 6,792,280 B1 *  9/2004  Hori et al. .................. 455/517
2002/0065074 A1 *  5/2002  Cohn et al. ................. 455/422
2002/0091643 A1 *  7/2002  Okamoto et al. ............ 705/53
2002/0184154 A1 * 12/2002  Hori et al. ................... 705/50

FOREIGN PATENT DOCUMENTS

JP        2001-78266 A      3/2001
WO     WO 01/41356 A1     6/2001

OTHER PUBLICATIONS

PCT/IPEA/409 prepared for International Application No. PCT/JP2003/002196 filed Feb. 27, 2003 (4 Pages).
Japanese Office Action mailed May 23, 2006.
Chinese Office Action in corresponding Chinese Application No. 03805195.8, dated Jan. 26, 2007.

* cited by examiner

*Primary Examiner*—Hung T. Vy
*Assistant Examiner*—Michael Le
(74) *Attorney, Agent, or Firm*—Brinks Hofer Gilson & Lione

(57) ABSTRACT

Server device 60 stores contract identification information with UIM (Universal Identity Module) identification information for identifying a UIM 20 issued in accordance with a subscription contract between a subscriber and a communication carrier for services provided by the communication carrier, the contract identification information identifying the subscription contract. The UIM 20 stores UIM identification information. After receiving the UIM identification information from the mobile station 30, which obtained the UIM identification information from UIM 20, server device 60 transmits the contract identification information corresponding to the UIM identification information to the mobile station 30. Then the contract identification information is stored in UIM 20. Consequently, the present invention allows a communication apparatus to distinguish a user who attempts to use the communication apparatus.

23 Claims, 13 Drawing Sheets

SERVER DEVICE, COMMUNICATION DEVICE, AND PROGRAM FOR MANAGING CONTENTS USAGE

TECHNICAL FIELD

The present invention relates to the art for restricting content usage.

BACKGROUND ART

A system for distributing content from a server of an information provider (IP) to a mobile station via a mobile packet communication network is well known. In such a system, distributed content is stored in a nonvolatile memory of the mobile station, and is used within the mobile station. Distribution of content permitted by a copyright holder to be used in the mobile station, is carried out using this system.

DISCLOSURE OF THE INVENTION

It is to be noted that, in the system described above, if no restriction is applied to content usage, a third person can use the content when the mobile station is transferred to the third person. That is to say, there is a possibility that a third person could use the content beyond a range permitted by the copyright holder. To avoid this, in a case that the mobile station is transferred to a new user, a step (e.g. initialization of nonvolatile memory) is taken to restrict content usage. However, in a case that a user is required to exchange his (her) mobile station due to a malfunction or the like, the above-described step prevents the user from using data which was stored in his (her) old mobile station, which causes inconvenience to the user.

A further problem may occur in mobile stations having UIM (Universal Identity Module) capability. For example, in a case that subscriber A uses subscriber B's mobile station with subscriber A's UIM, subscriber A has access to data in subscriber B's mobile station. In such a case, any content authorized for use by subscriber B only, can be used by subscriber A. This problem may be solved by allowing a user to use content in a mobile station only when a UIM which was attached to the mobile station when downloading the content is attached to the mobile station. For example, the content may be stored in a nonvolatile memory, with identification data of the UIM attached to the mobile station at that time. Use of the content would then be permitted only when the identification data of the UIM attached to the mobile station at that time is congruent with the identification data stored with the content in the nonvolatile memory.

A further problem occurs when a user exchanges his (her) UIM due to a malfunction or end of a service use time, whereby the identification data of the user's UIM changes despite continuation of the user's subscription contract. This situation arises because each UIM has unique identification data. For this reason, a user cannot use content after exchanging his (her) UIM even if the user is the person who downloaded the content.

As described above, in the prior art communication device content usage for authorized users may be restricted while allowing unauthorized content usage, which occurs because the communication device may not be able to distinguish authorized users from other users.

The present invention has been made to solve the above-described problems, and to enable a communication apparatus to distinguish authorized users from other users.

To solve the above problems, the present invention provides a server device, comprising: storage means for storing contract identification information for identifying a subscription contract made between a subscriber to a communication service and a communication carrier providing the service, and medium identification information for identifying a storage medium issued in accordance with the subscription contract; receiving means for receiving the medium identification information; extracting means for extracting from the storage means the contract identification information corresponding to the medium identification information received by the receiving means; and transmitting means for transmitting the contract identification information extracted by the extracting means to a communication apparatus for storing the received contract identification information in the storage medium, the communication apparatus being capable of accessing the storage medium identified by the medium identification information received by the receiving means.

The present invention also provides a communication apparatus, comprising: medium identification information extracting means for extracting medium identification information from a storage medium issued in accordance with a subscription contract made between a subscriber to a communication service and a communication carrier providing the communication service, the storage medium being capable of communicating with the communication apparatus; identification information transmitting means for transmitting the medium identification information to a server device, the medium identification information being extracted by the medium identification information extracting means, the server device transmitting contract identification information for identifying the subscription contract on the basis of which the storage medium is issued, the storage medium storing the received medium identification information; identification information receiving means for receiving the contract identification information transmitted from the server device; and storage means for storing the contract identification information in the storage medium whose identification information is extracted by the medium identification information extracting means, the contract identification information being received by the identification information receiving means.

The present invention also provides an application for causing a computer to store the contract identification information with the medium identification information, contract identification information identifying a contract between a subscriber and a communication carrier for services provided by the communication carrier, the medium identification information identifying the storage medium issued on the basis of the contract; to receive the medium identification information; to read the contract identification information stored by the storage step corresponding to the medium identification information received by the receiving step; and to transmit the contract identification information read by the reading means.

The present invention also provides an application for causing a computer to read the medium identification information from the storage medium issued in accordance with the contract; to transmit the medium identification information to the server device, the server device transmitting the contract identification information for identifying the contract on the basis of which the storage medium was issued; to receive the contract identification information transmitted by the server device; and to store the contract identification information received by the identification information receiving means in the storage medium whose medium identification information was read by the medium reading means.

The present invention may provide a storage medium for storing one of the above-described two applications.

According to each of the above embodiments, the contract identification information is stored in the storage medium. The communication apparatus can communicate information to the storage medium, so that the contract identification information is available in the communication apparatus.

The communication apparatus may further comprise: receiving means for receiving a content; encrypting means for encrypting the content received by the receiving means by referring to the contract identification information stored in the storage medium; and storage means for storing the content encrypted by the encrypting means. The communication apparatus may further comprise: receiving means for receiving the content; content encrypting means for encrypting the content by using a first key generated when the content was received by the receiving means; key encrypting means for encrypting the first key by using a second key generated when the content was received by the content receiving means, based on both a predetermined rule for generating keys and on the contract identification information stored in the storage medium capable of communicating information to the communication apparatus; and storage means for storing the content encrypted by the content encrypting means corresponding to the second key encrypted by the key encrypting means.

BEST MODE FOR CARRYING OUT THE INVENTION

Herein below, the system for restricting content usage, which is an embodiment of the present invention, will be explained with reference to the drawings. Note that like symbols are used for like components throughout the drawings.

[1] First Embodiment

The difference between the first embodiment and the second embodiment of the present invention is the use of restriction table T1 which stores sets of contract identification information for identifying a subscriber, and application (AP) identification information for identifying a distributed AP. Hereinbelow, a system in accordance with the first embodiment will be explained in detail.

(1) Configuration

Figure 1:
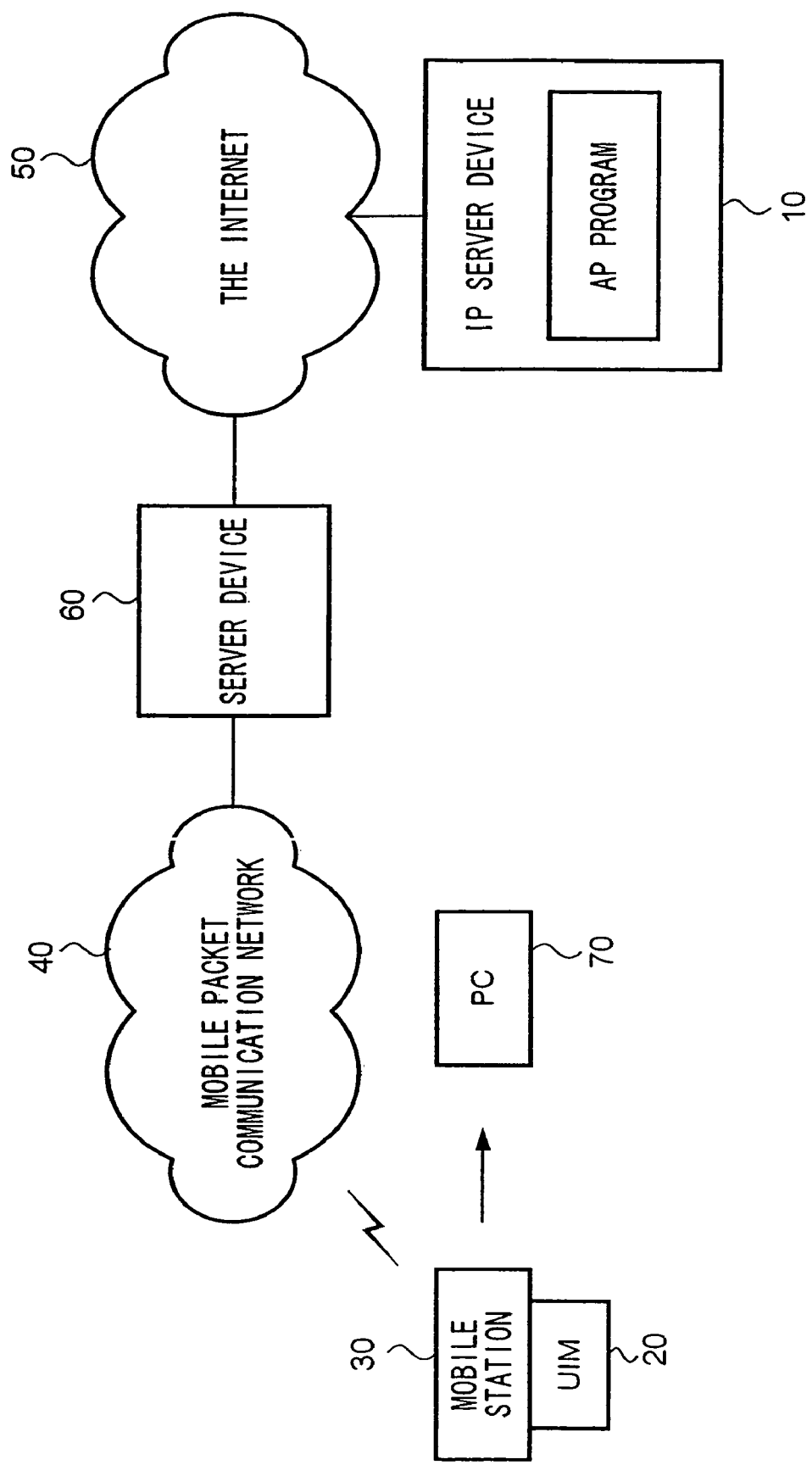
FIG. 1 shows an overall configuration of the system for restricting content usage in accordance with the first embodiment of the present invention.

FIG. 1 shows an overall configuration of the system. Regarding the system for restricting content usage shown in FIG. 1, it is assumed that mobile station 30 to which UIM 20 is mounted can download an AP program from IP server 10 storing AP programs, and execute the downloaded AP program.

As shown in FIG. 1, mobile packet communication network 40, which serves mobile station 30 when UIM 20 is mounted thereto, is connected to the Internet 50 via server device 60, which provides contract identification information. IP server device 10 is connected to the Internet 50. Note that PC (Personal Computer) 70 in FIG. 1 is installed to back up AP programs downloaded to mobile station 30. Also note that the system may comprise more than one UIM, mobile station, and IP server device, although only one of each of the respective entities is shown in FIG. 1.

(1-1) UIM 20

Figure 2:
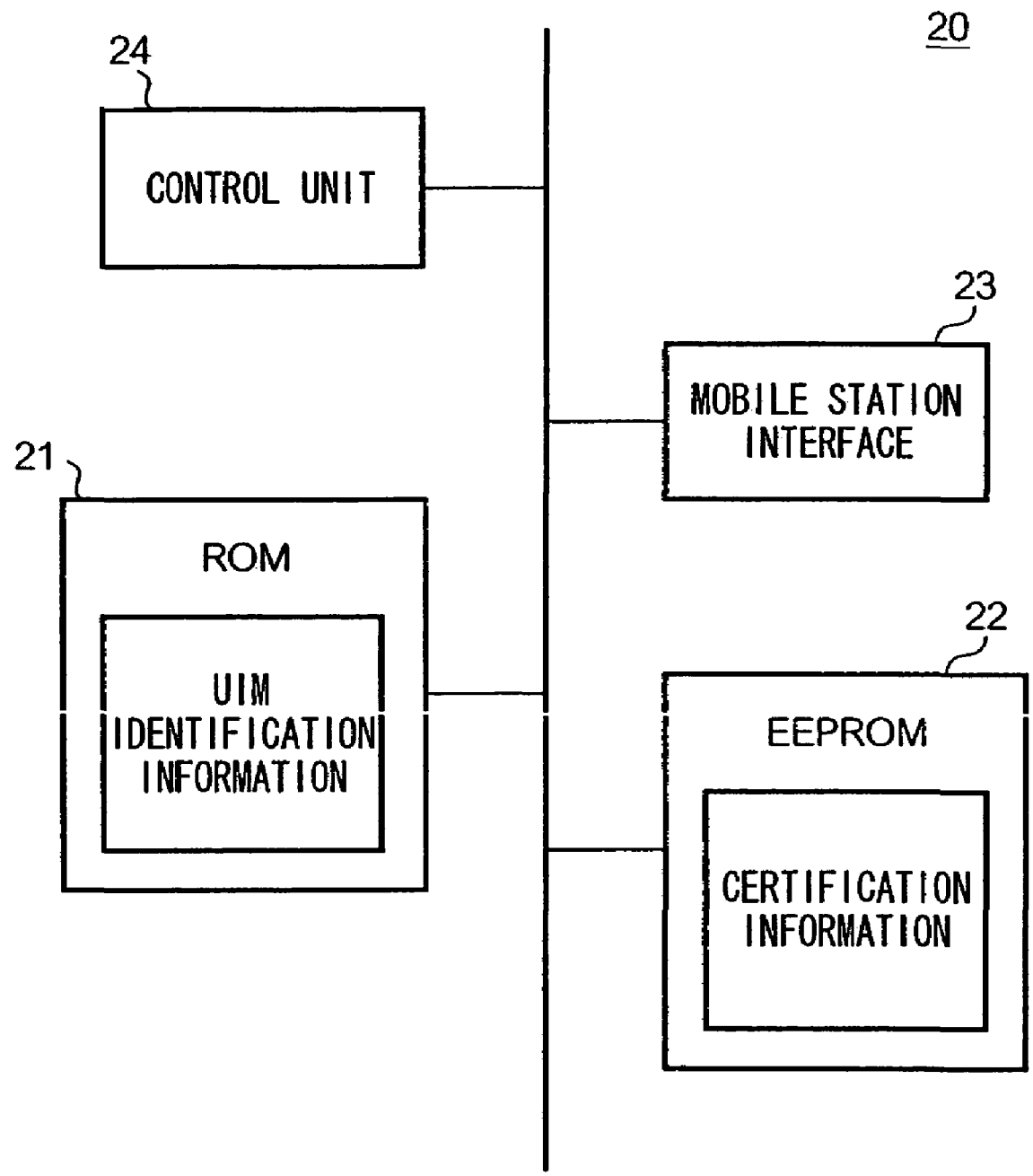
FIG. 2 is a block diagram showing a configuration of UIM (Universal Identity Module) 20, which is an entity of the system.

FIG. 2 is a block diagram showing a configuration of UIM 20. As shown in FIG. 2, UIM 20 comprises ROM (Read Only Memory) 21, EEPROM (Electrically Erasable Programmable Read Only Memory) 22 for storing certification information (described later), mobile station interface 23, control unit 24, and a bus for connecting the respective entities 21-24. Mobile station interface 23 is used when UIM 20 is mounted to mobile station 30. Mobile station 30 supplies power to mobile station interface 23 when UIM 20 is mounted on mobile station 30 whose power supply is switched on. Mobile station interface 23 supplies power to the respective entities 21-24. Mobile station interface 23 also relays signals between mobile station 30 and control unit 24.

When a request decoded from a signal transmitted from mobile station 30, via mobile station interface 23, is a storage request for storing certification information, control unit 24 causes the certification information included in the storage request to be stored in EEPROM 22. When the request from mobile station 30 is a request for submitting certification information, control unit 24 reads the certification information from EEPROM 22 and provides the information to mobile station 30 by transmitting the information as a signal to mobile station interface 23. When the request from mobile station 30 is a request for submitting UIM identification information, control unit 24 reads the UIM identification information from ROM 21 and provides the information to mobile station 30.

(1-2) Mobile Station 30

Figure 3:
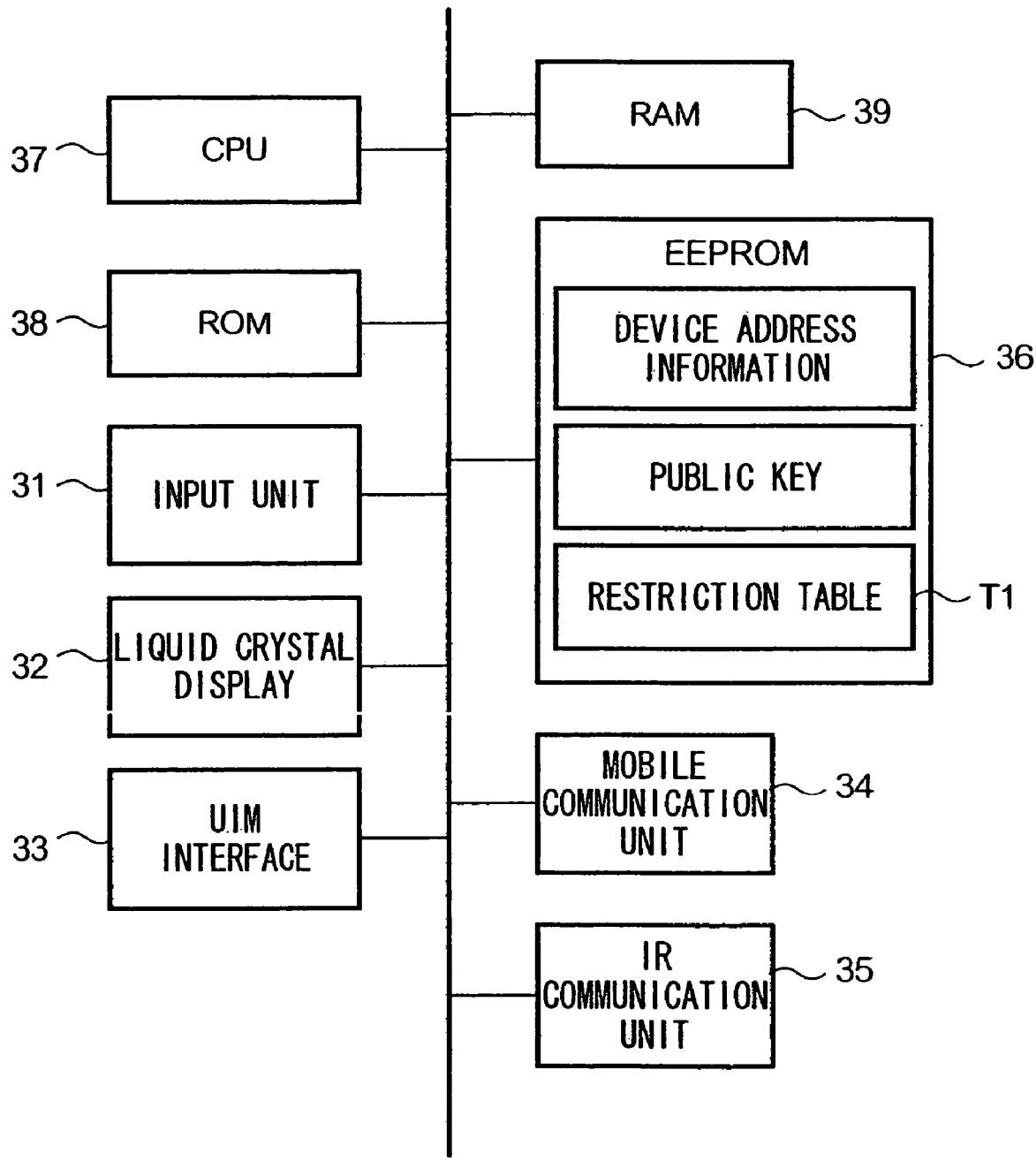
FIG. 3 is a block diagram showing a configuration of mobile station 30, which is an entity of the system.

FIG. 3 is a block diagram showing a configuration of mobile station 30. As shown in FIG. 3, mobile station 30 comprises input unit 31, liquid crystal display 32, UIM interface 33, mobile communication unit 34, IR (infrared) communication unit 35, EEPROM 36, CPU (Central Processing Unit) 37, ROM 38 storing control program operated by CPU 37, RAM (Random Access Memory) 39 used as work area for CPU 37, bus connecting respective entities 31-39, and a power supply (not shown in the figures) for respective entities 31-39.

Input unit 31 has a keypad via which a user inputs commands to mobile station 30, and which provides a signal to CPU 37 in response to input commands. Liquid crystal display 32 displays images in response to the signal provided from CPU 37.

UIM interface 33 is connected to mobile station interface 23 of UIM 20 at the time of mounting UIM 20 to mobile station 30, and performs a signal relay operation complementary to operation of mobile station interface 23. Namely, UIM interface 33 relays a signal between CPU 37 and UIM 20. UIM interface 33 also relays power from the power supply to UIM 20.

Mobile communication unit 34 operates in response to a command provided from CPU 37, and sends/receives wireless signals to/from mobile packet communication network 40. Mobile communication unit 34 receives packets from CPU 37, and transmits the packets as wireless signals to mobile packet communication network 40. Mobile communication unit 34 also receives wireless signals transmitted from mobile packet communication network 40, decodes packets from the wireless signals, and transmits the packets to CPU 37. IR communication unit 35 is used to output content stored in EEPROM 36 to PC 70 for backup. IR communication unit 35 comprises an IR receiver and an IR transmitter (neither of which is shown in the figures). IR receiver receives an IR signal and transmits information included in the signal to CPU 37. IR transmitter receives an IR signal from CPU 37, transmits information included in the signal outside the mobile station 30.

EEPROM 36 stores address information showing a telephone number of server device 60 and a public key provided by the communication carrier serving mobile packet communication network 40. EEPROM 36 is also used for storing distributed AP programs, restriction table T1, and other related files.

When power is supplied to mobile station 30 when UIM 20 is mounted thereto, CPU 37 reads the control program from ROM 38 and executes it. CPU 37 provides a user-interface and operates in response to a command determined based on both a state of the user-interface and a signal from input unit 31.

(1-3) PC 70

PC 70 in FIG. 1 is a computer device. PC 70 has an IR communication unit which operates in conjunction with IR communication unit 35 in mobile station 30, and stores information inputted from the IR communication unit.

(1-4) Mobile Packet Communication Network

Mobile packet communication network 40 is served by the communication carrier, which provides mobile packet communication services to its subscribers. This mobile packet communication network 40 comprises switching centers, wireless base stations, etc. (not shown in the figures). When a packet is received from mobile station 30, mobile packet communication network 40 first identifies a telephone number corresponding to the identification information of the source of the packet. Then, information indicating the telephone number is added to the packet, and the packet is transmitted to the destination identified by destination address information. Further, mobile packet communication network 40 transmits the packet received from server device 60 to the destination identified by the destination address information in the packet.

(1-5) Server Device 60

Server device 60 is served by the above-described communication carrier.

Figure 4:
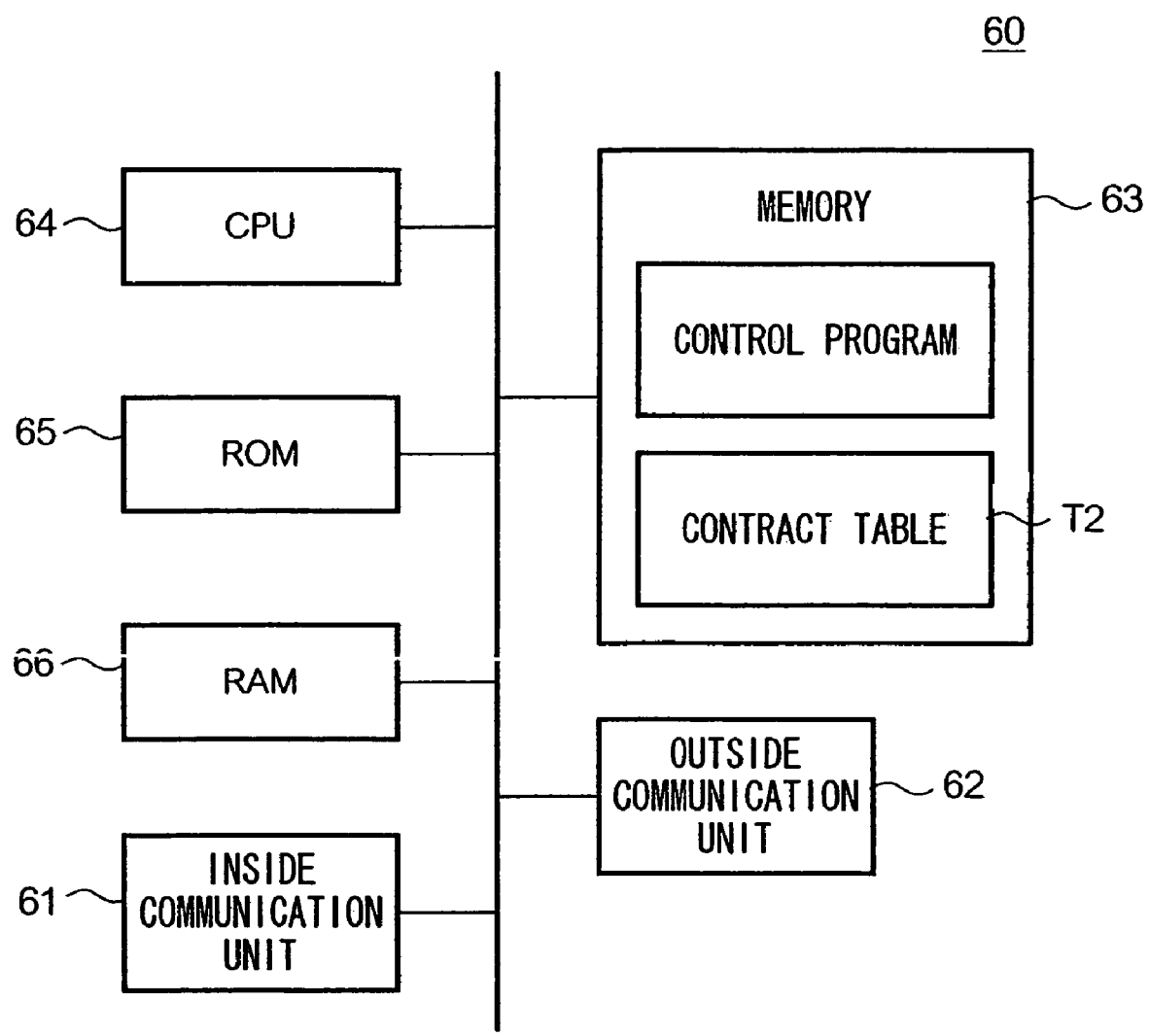
FIG. 4 is a block diagram showing a configuration of server device 60, which is an entity of the system.

FIG. 4 is a block diagram showing a configuration of server device 60. As shown in FIG. 4, server device 60 comprises: an internal communication unit 61 connected to mobile packet communication network 40; an external communication unit 62 connected to the Internet 50; a nonvolatile memory 63 such as a hard disk or a semiconductor; CPU 64; ROM 65 for storing a startup program executed by CPU 64; RAM 66 used as a work area for CPU 64; and a power supply (not shown in the figures) for supplying power to respective entities 61-66.

Internal communication unit 61 communicates with mobile communication unit 34 of mobile station 30. Namely, internal communication unit 61 relays packets between CPU 64 and mobile packet communication network 40. However, since internal communication unit 61 is connected by a wire to mobile packet communication network 40, the signal transmitted/received between internal communication unit 61 and mobile packet communication network 40 is a wired signal. External communication unit 62 operates in response to an instruction provided by CPU 64, and transmits/receives a signal to/from the Internet 50. External communication unit 62 receives packets transmitted from CPU 64, and transmits the packets to the Internet 50 as a signal. External communication unit 62 also receives a signal transmitted from the Internet 50, then decodes packets included in the signal, and finally transmits the packets to CPU 64. Finally, the packets are transmitted to mobile station 30.

It is to be noted that, to become a subscriber, it is necessary to make a subscription contract with a communication carrier that provides communication services. Only a subscriber can be provided with the communication services of the carrier. Memory 63 stores contract table T2 and a control program. Contract table T2 stores sets of subscription contract information and contract identification information for identifying a subscription contract. The control program is executed by CPU 37. Subscription contract information includes information necessary for identifying a subscriber, but does not include information showing his (her) telephone number or UIM identification information. Accordingly, a subscriber can change his (her) telephone number and UIM while continuing his (her) subscription contract.

Since a message transmitted or received via the Internet 50 comprises at least one packet, external communication unit 62 transmits at least one packet when transmitting a message and receives at least one packet when receiving a message.

(1-6) IP Server Device 10

IP server device 10 is a server device served by an IP (information provider). IP server device 10 stores AP programs and can distribute the AP programs to mobile station 30. When a request message for transmitting an AP program is transmitted from server device 60, the request message is first received in IP server device 10. Then, IP server device 10 generates a distribution message including the AP program stored in the location indicated by the destination URL (Uniform Resource Locator) in the request message, and transmits the distribution message to mobile station 30. In the preferred embodiments, it is assumed that the copyright holders of the AP programs stored in IP server 10 permit a user to execute the AP program and to copy the AP program for backup.

(2) Operation of the Entities

Figure 5:
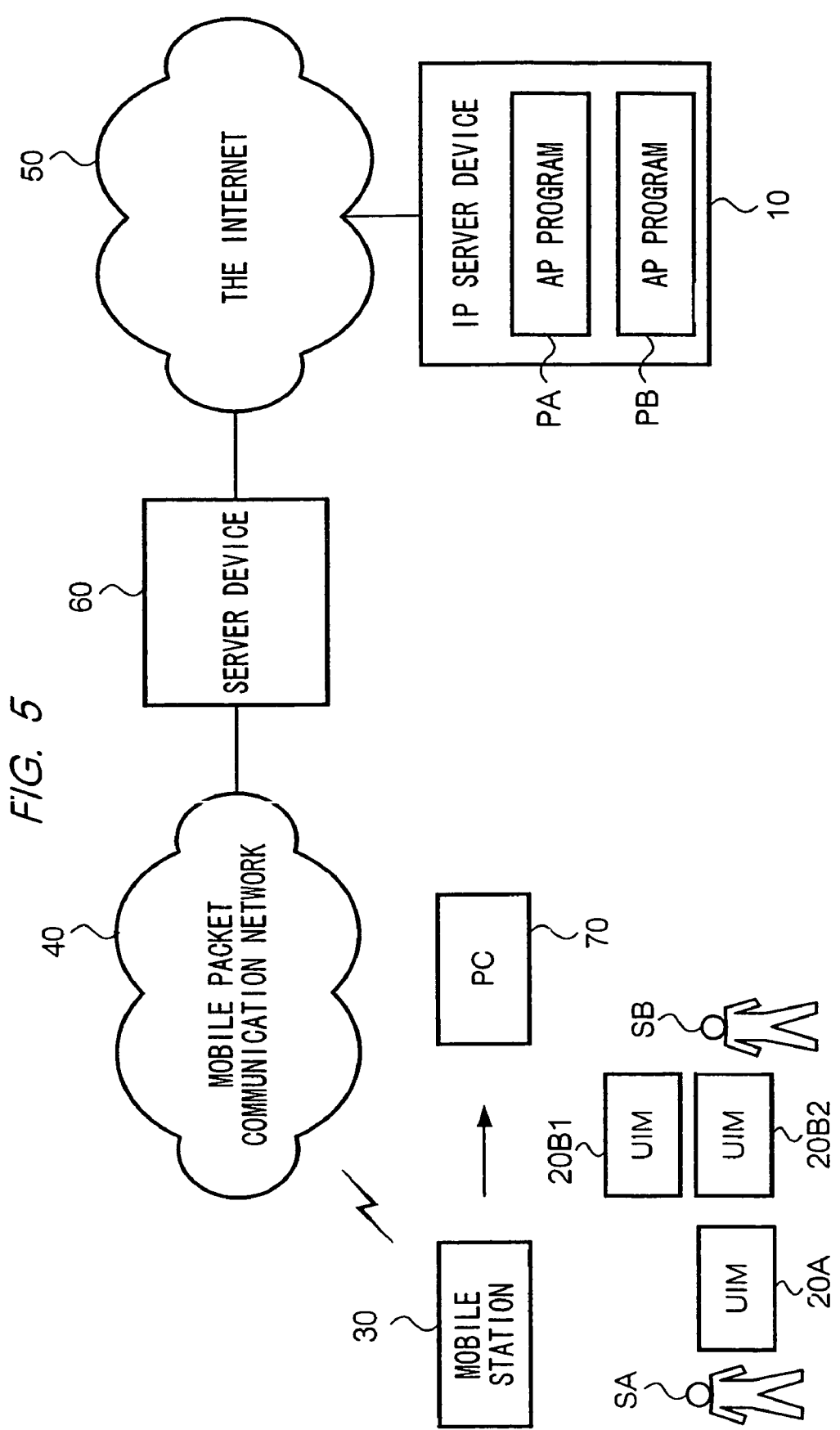
FIG. 5 is a conceptual diagram showing the operation of the system.

In this section, an operation of the first embodiment will be described. For the purpose of this description, the following is assumed: As shown in FIG. 5, subscriber SA and subscriber SB who are able to access services by using mobile packet communication network 40, use mobile station 30; Subscriber SA owns UIM 20A, and subscriber SB owns UIM 20B1 and UIM 20B2. These UIMs, that is, UIM 20A, UIM 20B1, and UIM 20B2 have the same configuration as the above-described UIM 20; and IP server device 10 stores AP program PA and AP program PB.

(2-1) The Operation of Server Device 60

Figure 6:
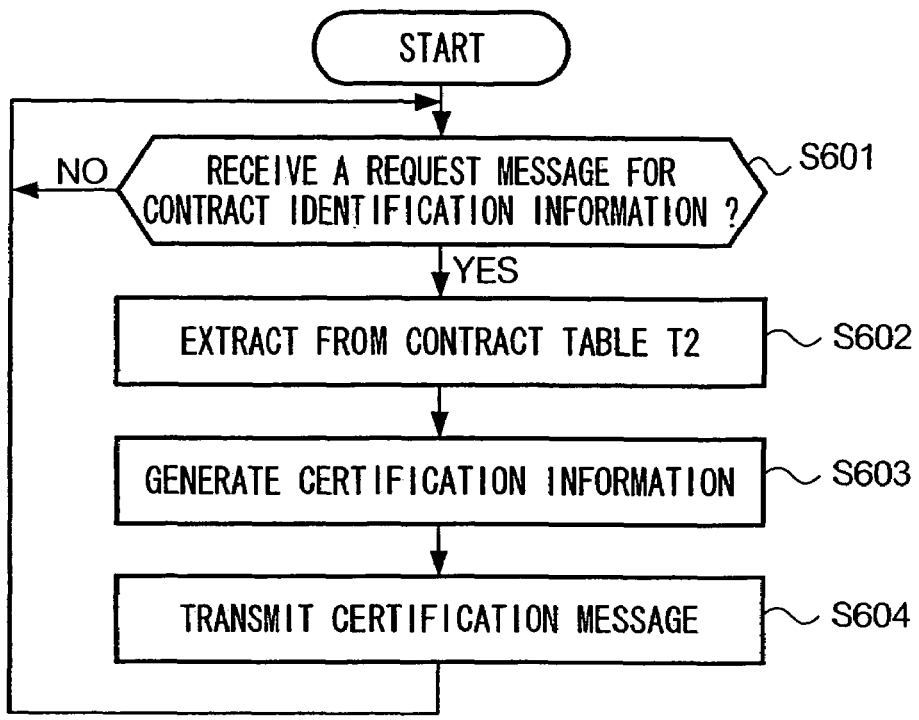
FIG. 6 is a block diagram showing the flow of the output process in server device 60.

First, an operation of server device 60 for restricting content usage will be described. When the power supply is switched on, CPU 64 of server device 60 reads the startup program from ROM 65 and executes the startup program. After executing the startup program, CPU 64 reads the control program from memory 63 and executes it. During the execution of the control program, CPU 64 carries out the process shown in FIG. 6 until the control program is suspended. Namely, when CPU 64 receives a request message (S601:YES) for contract identification information via external communication unit 64, CPU 64 extracts (S602) contract identification information and subscription contract information from contract table T2. The contract identification information and subscription contract information correspond to the UIM identification information in the request message. Then, CPU 64 generates (S603) certification information showing that UIM 20 is a valid UIM certified by the subscription contract identified by the UIM identification information, the subscription contract information, and the contract identification information. The certification information includes the contract identification information and is encrypted using an encryption key of the communication carrier serving mobile packet communication network 40. Finally, CPU 64 transmits (S604) the certification message including the certification information to mobile station 30 via internal communication unit 61.

Furthermore, when CPU 64, while operating the control program, receives a request message for transmitting an AP program via internal communication unit 61, CPU 64 transmits the request message to the IP server device identified by the destination URL included in the request message. Subsequently, CPU 64 receives the distribution message (described later) in response to the request message from the IP server device, and transmits the distribution message to the mobile station that sent the request message for the AP program.

(2-2) Initial Operation of UIM 20A

Next, an initial operation of UIM 20A will be described.

For the purpose of this description, the following is assumed: UIM 20A has not yet stored the certification information corresponding to UIM 20A; UIM 20A of subscriber SA is mounted to mobile station 30; and the power supply to mobile station 30, and that to server device 60 are already switched on.

Figure 7:
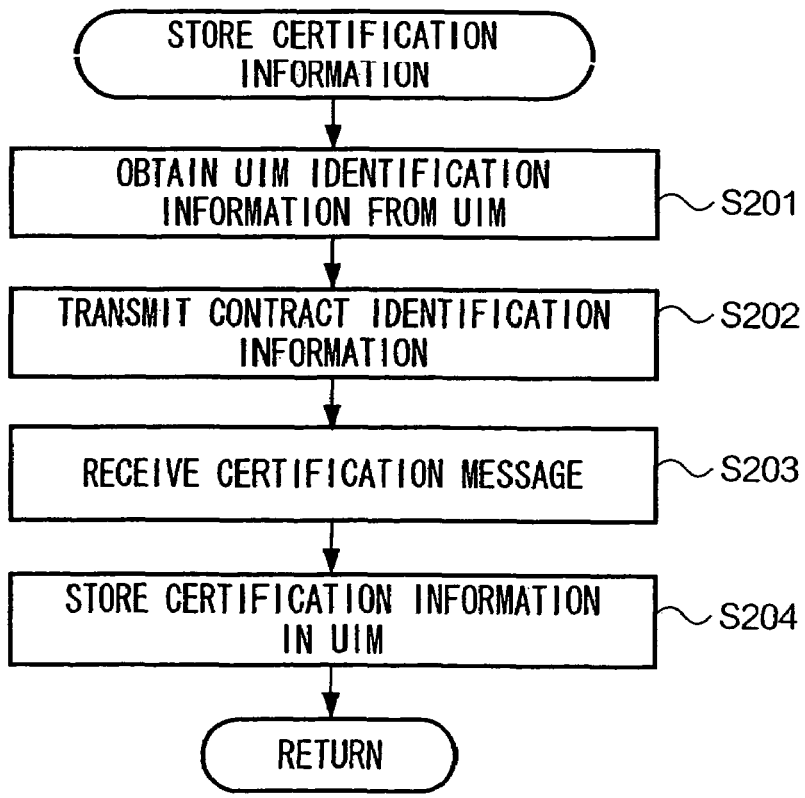
FIG. 7 is a block diagram showing the flow of the storage process of certification information in mobile station 30.

Subscriber SA who attempts to download an AP program to mobile station 30, first operates the keypad of input unit 31, and enters an instruction to download the certification information of UIM 20A and to store the certification information in UIM 20A. When the instruction is entered, the process for storing the certification information shown in FIG. 7 is carried out. Namely, CPU 37 of mobile station 30 first obtains UIM identification information from UIM 20A. (S201) Specifically, first, a signal requesting UIM identification information is transmitted to UIM 20A via UIM interface 33. Then, control unit 24 of UIM 20A, which has received the request, reads the UIM identification information stored in ROM 74, and transmits it to mobile station 30 via UIM interface 33.

After receiving the UIM identification information from UIM 20A, CPU 37 in mobile station 30 reads the device address information stored in ROM 38, and sets the device address information as the destination address. Consequently, CPU 37 transmits (S202) a request message for transmitting contract identification information to mobile packet communication network 40 via mobile communication unit 34. The request message includes the UIM identification information. The request message is a message requesting server device 60 to transmit the contract identification information corresponding to the UIM identification information of UIM 20A. Here, server device 60 is identified by the device address information.

The request message is transmitted to server device 60 by mobile packet communication network 40, and is received by internal communication unit 61 of server device 60. In server device 60, the message received by the internal communication network, is transmitted to CPU 64. After receiving the message, CPU 64 extracts the contract identification information and the subscription contract information from contract table T2. Here, both the contract identification information and the subscription contract information correspond to the UIM identification information included in the request message.

After reading the contract identification information and subscription identification information, CPU 64 generates certification information for UIM 20A, and transmits a certification message including the certification information to mobile station 30 via internal communication unit 61. The certification message is transmitted to mobile station 30 by mobile packet communication network 40, and is received (S203) by mobile communication unit 34 of mobile station 30. In mobile station 30, the certification message received by mobile communication unit 34 is transmitted to CPU 37. CPU 37 then requests (S204) UIM 20A to store the certification information in UIM 20A. Here, the certification information is included in the certification message. After receiving the request, control unit 24 in UIM 20A stores the certification information in EEPROM 22 of UIM 20A.

It is impossible to falsify the certification information stored in EEPROM 22 because the certification information is encrypted using the encryption key of the communication carrier serving mobile packet communication network 40. Furthermore, the certification message is transmitted to mobile station 30 only via mobile packet communication network 40. Since secure communication in mobile packet communication network 40 is ensured by the communication carrier, there is no risk of third party interference with the certification information during communication.

It is to be noted that a message transmitted and received via the mobile packet communication network comprises at least one packet. Accordingly, mobile communication unit 34 transmits at least one packet when sending a message and receives at least one packet when receiving a message. A packet transmitted by mobile communication unit 34 includes a destination address and a sender address. For example, the packets comprising the above-described request message for transmitting contract identification information include the device address information as a destination address.

(2-3) Download Process of an AP Program with UIM 20A

The process for downloading AP program PA by subscriber SA with UIM 20A will be described in this section.

Figure 8:
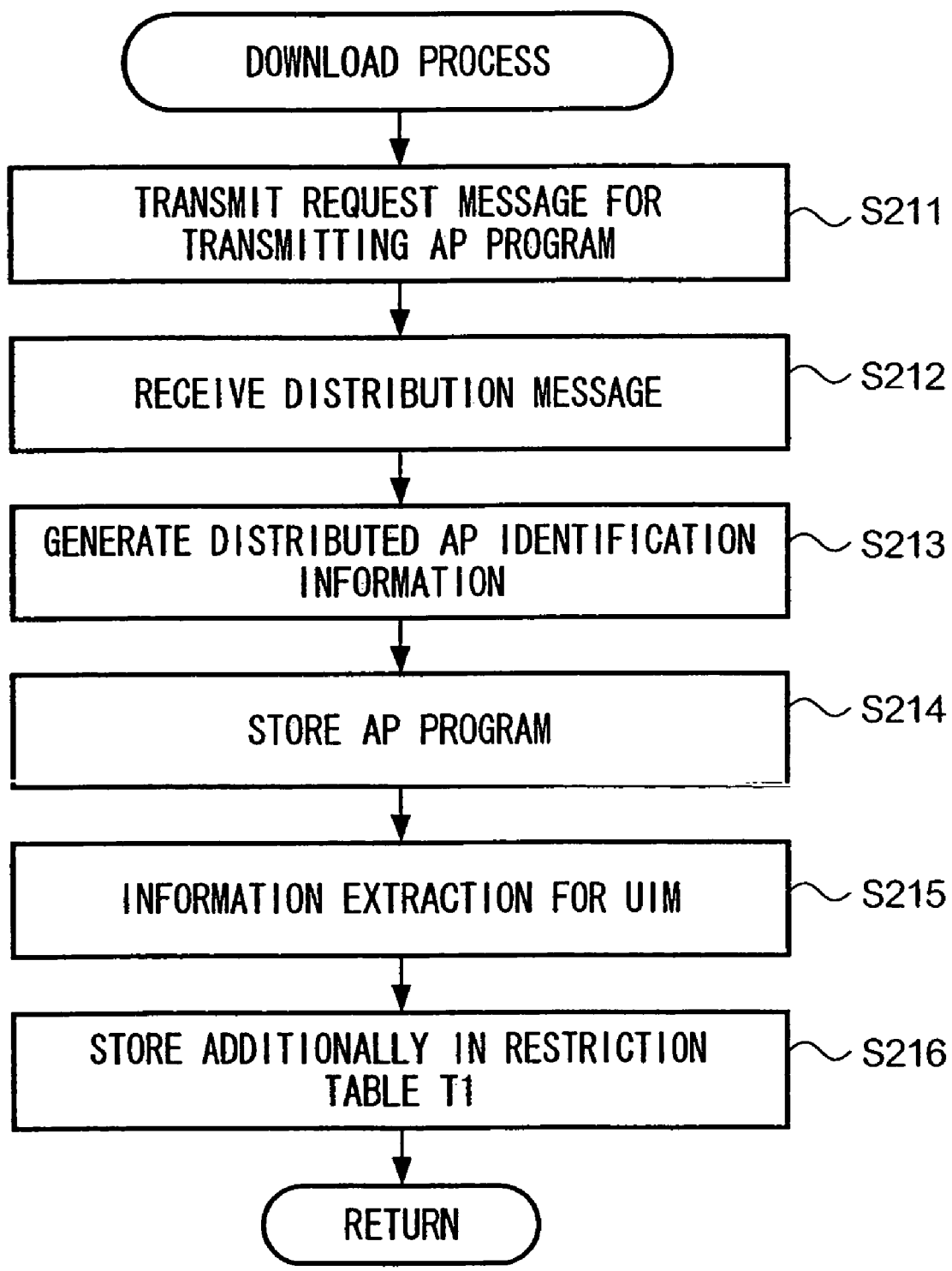
FIG. 8 is a block diagram showing the flow of the download process in mobile station 30.

If subscriber SA enters an instruction for downloading AP program PA to mobile station 30 from IP server device 10, the download process shown in FIG. 8 is carried out. Namely, CPU 37 first transmits (S211) a request message for distributing AP program PA to server device 60 via mobile packet communication network 40. The request message includes the URL of AP program PA as a destination URL. Since the destination URL of the request message is the URL of AP program PA stored in IP server 10, the request message is transmitted from server device 60 to IP server device 10 via the Internet 50.

Then, IP server 10 generates a distribution message including AP program PA identified by the destination URL in the received request message, and sends back the distribution message. Consequently, the distribution message is transmitted to mobile station 30 via the Internet 50, server device 60, and mobile packet communication network 40. Subsequently, the distribution message is received by mobile communication unit 34, and is then transmitted to CPU 37. Thus, CPU 37 receives (S212) the distribution message.

CPU 37 generates (S213) distributed AP identification information for identifying AP program PA in mobile station 30. Here, AP program PA is included in the distribution message. Consequently, CPU 37 stores (S214) the distributed AP identification information in correspondence with AP program PA in EEPROM 36. Further, CPU 37 performs information extraction for UIM (S215). Namely, first, CPU 37 requires UIM 20A mounted to mobile station 30 to provide the certification information stored in EEPROM 22 of UIM 20A, and obtains the certification information. Then, CPU 37 reads the public key of the communication carrier from EEPROM 36. Here, the communication carrier serves mobile packet communication network 40. Finally CPU 37 decrypts the certification information by using the public key, and extracts the contract identification information from the decrypted certification information. Consequently, CPU 37 stores the contract identification information in correspondence with the distributed AP identification information which was generated in advance. Note that restriction table T1 has been stored in EEPROM prior to this download process.

(2-4) Download Process of AP Program with UIM 20B1

The download process of AP program PB with UIM 20B1 to mobile station 30 will be described in this section.

In this section, the following is assumed: the contract identification information corresponding to UIM 20B1 has already been stored in EEPROM 22 of UIM 20B1; UIM 20B1 of subscriber SB is mounted to mobile station 30, the power supply of mobile station 30 is already switched on; and mobile station 30 can perform packet communication via mobile packet communication network 40 by using a telephone number corresponding to UIM 20B1.

If subscriber SB enters an instruction for downloading AP program PB from IP server device 10 to mobile station 30, a download process is carried out by subscriber SA, which is similar to the above-described download process for downloading AP program PA to mobile station 30 with UIM 20A mounted thereto. However, in this download process, the URL of AP program PB is substituted for the destination URL of the request message for sending the AP program, and AP program PB is substituted for the AP program included in the distribution message transmitted from IP server 10 to mobile station 30.

As a result of the above-described process, AP program PB is stored with the distributed AP identification information for identifying AP program PB in mobile station 30. In restriction table T1, the distributed AP identification information is stored with the contract identification information included in the certification information stored in EEPROM 22 of UIM 20B1. (S216)

(2-5) Execution Process of AP Program with UIM 20B1

The execution process of an AP program downloaded to mobile station 30 by subscriber SB will be described in this section.

Figure 9:
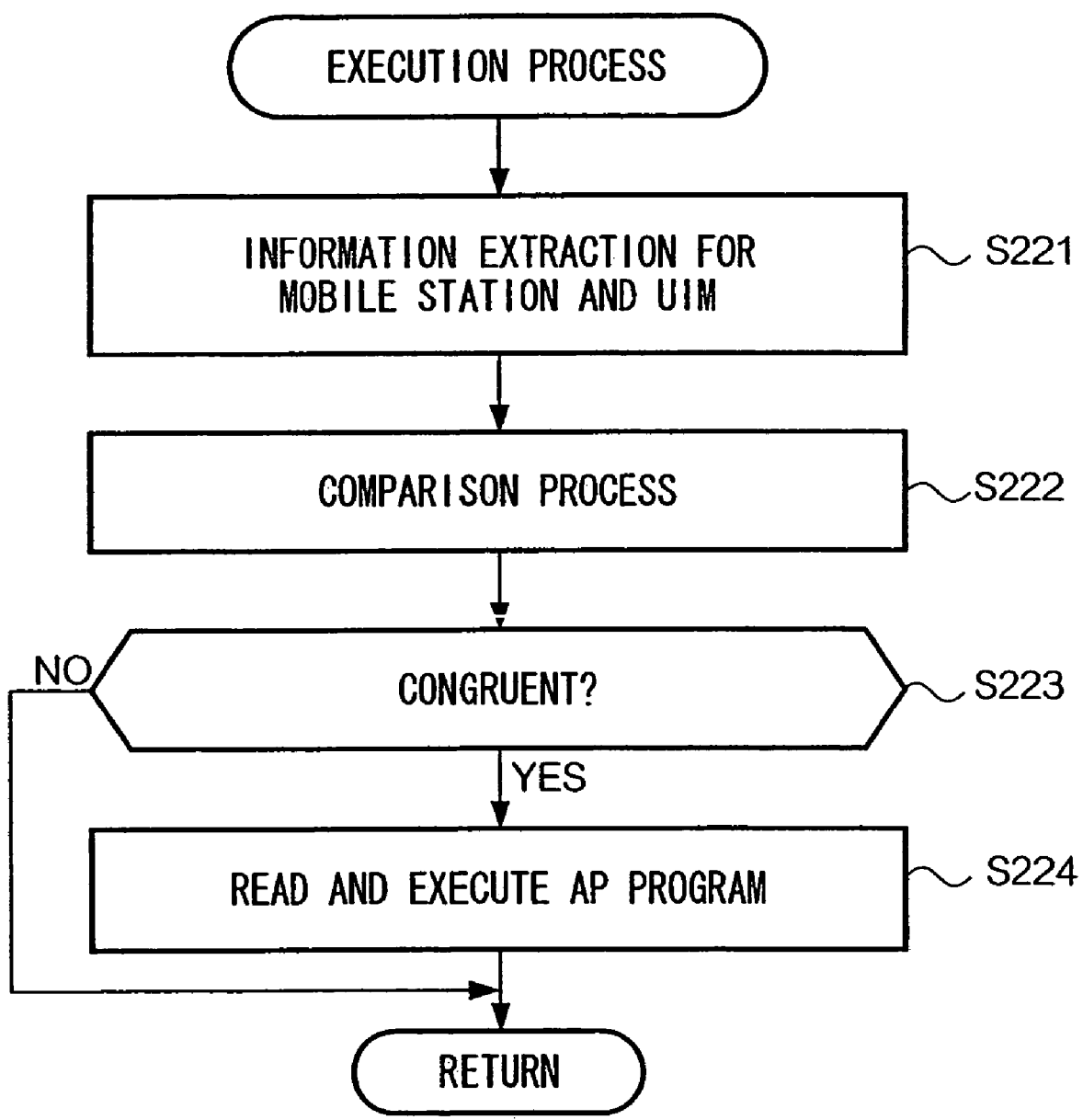
FIG. 9 is a block diagram showing the flow of the execution process in mobile station 30.

If subscriber SB enters an instruction for executing AP program PB stored in EEPROM 36 of mobile station 30, the execution process shown in FIG. 9 is executed. Namely, CPU 37 in mobile station 30 first performs the mobile station information extraction for AP program PB, and carries out the above-described UIM information extraction process for UIM 20B1 (S221). Mobile station information extraction is carried out as follows: CPU 37 searches restriction table T1 for the distributed AP identification information. Restriction table T1 stores a plurality of data sets. Each data set of distributed AP identification information and contract identification information corresponds to the distributed AP identification information. If CPU 37 finds the distributed AP identification information of AP program PB, CPU 37 extracts the contract identification information corresponding to the distributed AP identification information. Then, CPU 37 carries out a comparison process (S222) for comparing the contract identification information extracted by mobile station information extraction with the contract identification information extracted by UIM information extraction process. CPU 37 reads from EEPROM 36 and executes (S223 and S224) the AP program only when the two items of contract identification information are congruent.

As described above, the contract identification information stored in restriction table T1 with the distributed AP identification information for identifying AP program PB is contract identification information corresponding to UIM 20B1. Accordingly, in the comparison process, it is determined whether the above two items of contract identification information are congruent. Therefore, CPU 37 reads from EEPROM 36 and executes AP program PB.

If subscriber SB enters an instruction for executing AP program PA stored in EEPROM 36, a process similar to the execution process of AP program PB is carried out. In this case, the contract identification information corresponding to UIM 20A is substituted for the contract identification information extracted from restriction table T1. Accordingly, the two items of contract identification information are not congruent. Therefore, CPU 37 does not execute AP program PA. Namely, the execution of AP program PA is inhibited.

(2-6) Backup Process of AP Program with UIM 20B1

The output process of an AP program from mobile station 30 for backup to PC 70 existing outside mobile station 30 will be described in this section. Here, the AP program is downloaded to mobile station 30 by subscriber SB.

In this section, the following is assumed: mobile station 30 and PC 70 are disposed so that the receiver/transmitter units for IR communication of mobile station 30 and PC 70 can communicate with each other.

Figure 10:
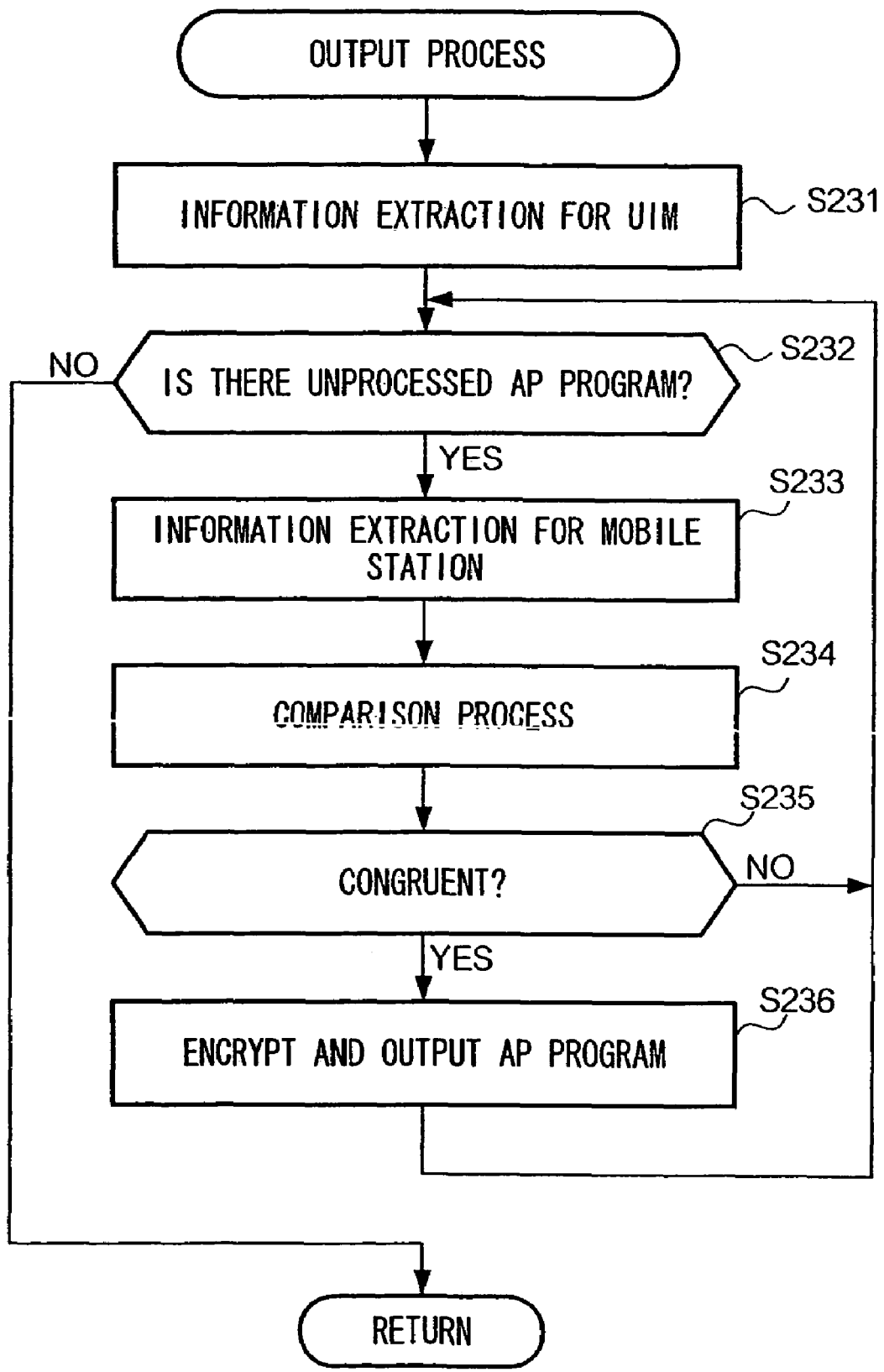
FIG. 10 is a block diagram showing the flow of the output process in mobile station 30.

If subscriber SB enters an instruction for outputting AP programs stored in EEPROM 36 to mobile station 30, the output process shown in FIG. 10 is carried out. Namely, CPU 37 of mobile station 30 first carries out the above-described UIM information extraction process (S231). Then, CPU 37 executes the above-described mobile station information extraction and comparison process (S232, S233, S234, and S235) for each AP program stored in EEPROM 37. For AP programs determined in the comparison process to have congruent items of contract identification information, CPU 37 executes the following processes: first, CPU 37 reads the AP program from EEPROM 36; next, CPU 37 generates an encryption key corresponding to the contract identification information extracted by the UIM information extraction process, and encrypts the AP program by using the encryption key as the public key; and finally, CPU 37 outputs (S236) the encrypted AP program from IR communication unit 35 as an IR signal.

In the case of the comparison process for AP program PA, the two items of contract identification information are not determined to be congruent. Therefore, mobile station 30 does not output AP program PA. Namely, the output process for AP program PA is prevented.

In the case of the comparison process for AP program PB, the two items of contract identification information are determined to be congruent. Therefore, CPU 37 reads AP program PB from EEPROM 36, and encrypts AP program PB by using the encryption key generated by the above-described UIM information extraction process as the public key. Then, CPU 37 transmits the encrypted AP program PB to PC 70 by IR communication. The transmitted AP program PB is received and is stored by PC 70. It is impossible to decrypt the AP program PB because the contract identification information and the encryption key are at no time outputted outside mobile station 30. Since the encryption key for encrypting AP program PB was generated in accordance with the contract identification information corresponding to UIM 20B1, the execution of AP program PB is prevented.

(2-7) Various Processes with UIM 20B2

The various processes carried out when subscriber SB obtains new UIM 20B2 without interruption of his (her) subscription contract, are described in the following.

In this section, it is assumed that: UIM 20B2 is mounted to mobile station 30, and the power supply of mobile station 30 is already switched on; and mobile station 30 can perform packet communication via the mobile packet communication network by using a telephone number corresponding to UIM 20B2.

When subscriber SB first uses UIM 20B2, the process (FIG. 7) is similar to the process carried out when UIM 20A is first used by subscriber SA as described above. In this case, the UIM identification information corresponding to UIM 20B2 is substituted for the UIM identification information included in the request message for the contract identification information transmitted from mobile station 30 to server device 60. Accordingly, the certification information generated in server device 60 and stored in EEPROM 22 of UIM 20B2 shows that UIM 20B2 meets the conditions of the subscription contract (i.e. continued subscription contract) for subscriber SB, even though the certification information is not congruent with the certification information for UIM 20B1.

Since the contract identification information is included in the certification information stored in EEPROM 22 of UIM 20B2, the contract identification information includes the subscription contract to which UIM 20B1 corresponds and which has been continued. Therefore, the contract identification information in the certification information stored in EEPROM 22 of UIM 20B2 is congruent with the contract certification information stored in EEPROM 22 of UIM B1.

If subscriber SB attempts to execute AP program PB stored in EEPROM 36 of mobile station 30, a process (FIG. 9) similar to the above-described execution process of AP program PB with UIM 20B1 is carried out not for UIM 20B1, but for UIM 20B2. As described above, since the contract identification information stored in UIM 20B2 is congruent with that of UIM 20B1, the former contract identification information is congruent with the contract identification information extracted by the mobile station information extraction process. Therefore, AP program PB is executed in mobile station 30. Namely, subscriber SB can use AP program PB by using UIM 20B2, similarly to the case where UIM 20B1 is mounted to mobile station 30. Further, AP program PB can be outputted similarly to the case where UIM 20B1 is mounted to mobile station 30.

[2] Second Embodiment

The major difference between the usage restriction system of the first embodiment and that of the second embodiment is the use of restriction table T1. In the second embodiment, it is not necessary to use restriction table T1 by encrypting downloaded AP programs. Hereinbelow, the differences between the usage restriction system of the first embodiment and that of the second embodiment will be described.

(1) Configuration

Figure 11:
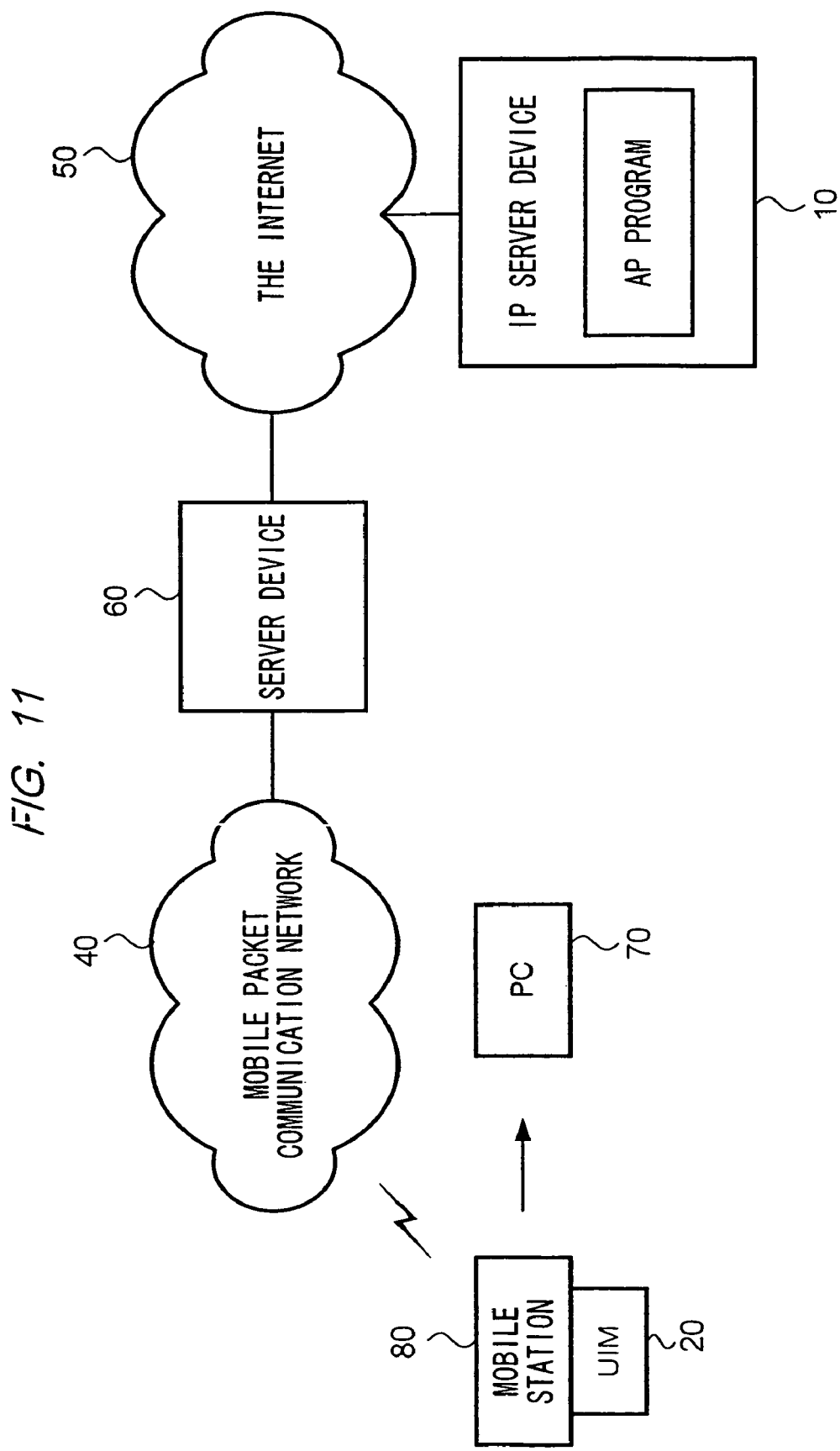
FIG. 11 shows an overall configuration of the system for restricting content usage in accordance with the second embodiment of the present invention.
Figure 12:
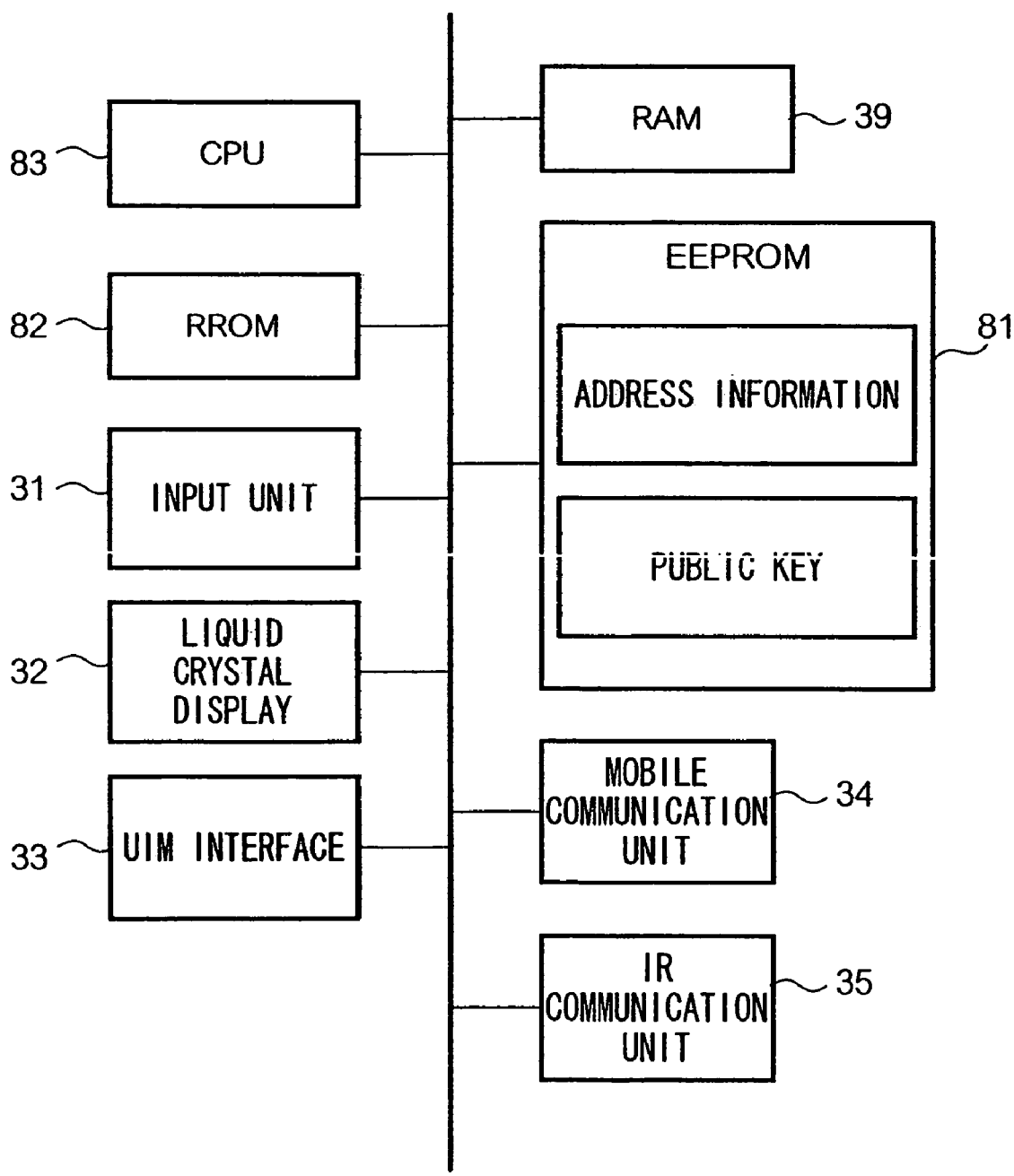
FIG. 12 is a block diagram showing a configuration of mobile station 80, which is an entity of the system.

FIG. 11 shows an overall configuration of the system of the second embodiment. The system in FIG. 11 differs in only one point from the system in FIG. 1; mobile station 80 is substituted for mobile station 30. Mobile station 80 in FIG. 11 differs in only three points from mobile station 30 in FIG. 1; EEPROM 81 is substituted for mobile station 36, ROM 82 is substituted for ROM 82, and CPU 83 is substituted for CPU 37.

EEPROM 81 stores different content from that stored in EEPROM 36, and this is the only difference between EEPROM 81 and EEPROM 36. ROM 82 stores a different control program from that stored in ROM 38, and this is the only difference between ROM 82 and ROM 38. CPU 83 executes the control program stored in ROM 82, and this is the only difference between CPU 83 and CPU 37. According to these differences, the download process, execution process, and output process executed by CPU 83 are different from those executed by CPU 37.

(2) Operation

An operation of the second embodiment will now be described. Any description of the differences in accordance with only the substitution of mobile station 80 for mobile station 30, is omitted. Note that the assumptions at each stage of the process in the second embodiment are the same as those in the first embodiment. A description of initial use of UIM 20A is omitted because the process is the same as that of the first embodiment.

(2-1) Download Process of AP Program with UIM 20A

Figure 13:
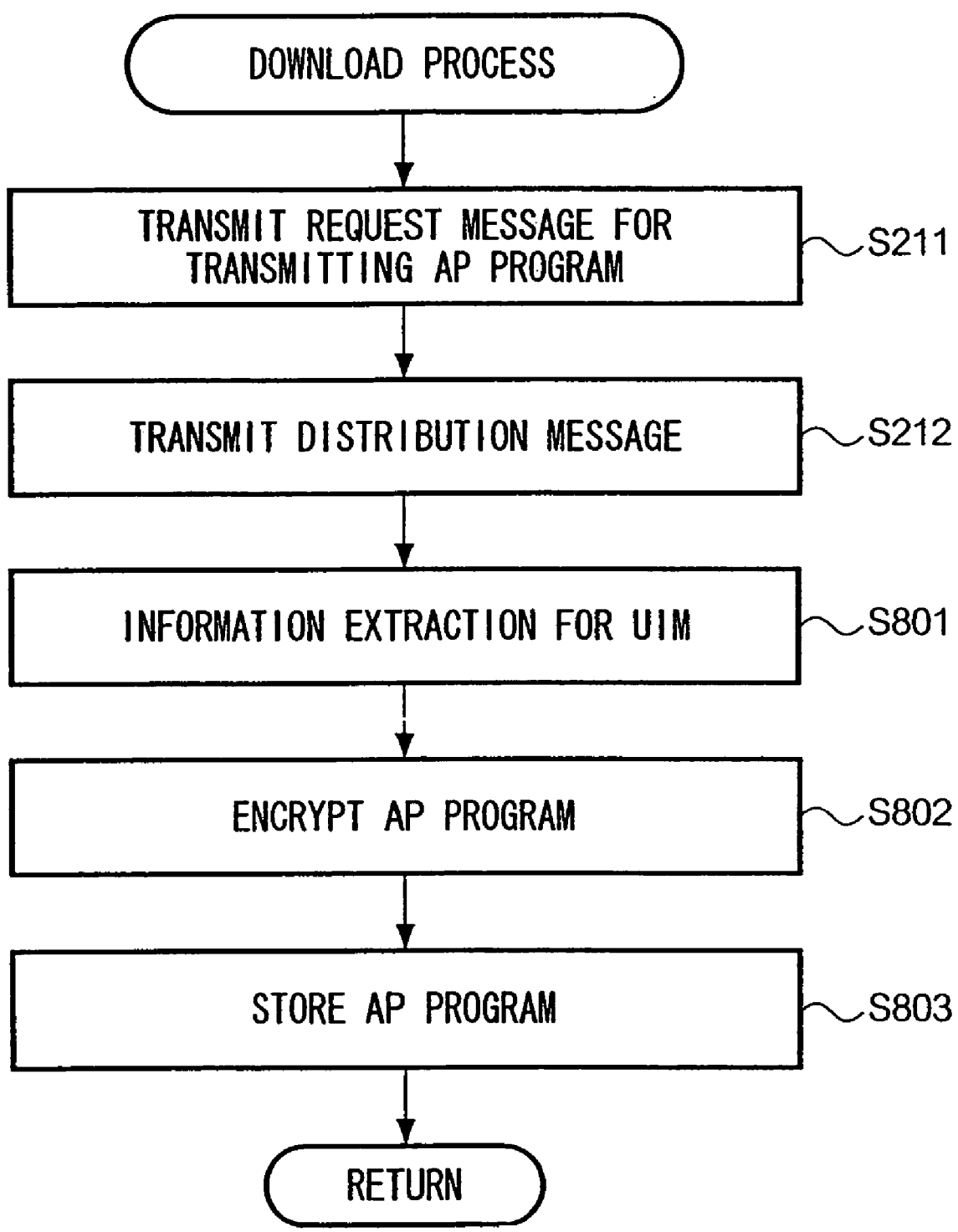
FIG. 13 is a block diagram showing the flow of the download process in mobile station 80.

When subscriber SA downloads AP program PA to mobile station 80 with UIM 20A, the download process shown in FIG. 13 is carried out. Namely, a similar process (S211, S212) to the download process in the first embodiment is carried out until CPU 83 of mobile station 80 receives the distribution message. Then, CPU 83 carries out the UIM information extraction process (S801), then obtains the certification information stored in UIM 20A, and finally extracts the contract identification information from the certification information. Then, CPU 83 generates an encryption key in accordance with the extracted contract identification information, and encrypts (S802) the AP program by using the encryption key as the public key. Finally, CPU 83 stores (S803) the encrypted AP program in EEPROM 81.

(2-2) Download Process of AP Program with UIM 20B1

When subscriber SB downloads AP program PB to mobile station 80 with UIM 20B1, a process is carried out similar to the above-described download process for downloading AP program PA to mobile station 30 with UIM 20A mounted thereto, by subscriber SA. In this case, AP program PB is encrypted by using the encryption key generated in accordance with the contract identification information included in the certification information stored in UIM 20B1 because the UIM mounted to mobile station 80 is not UIM 20A but UIM 20B1.

(2-3) Execution Process of AP Program with UIM 20B1

Figure 14:
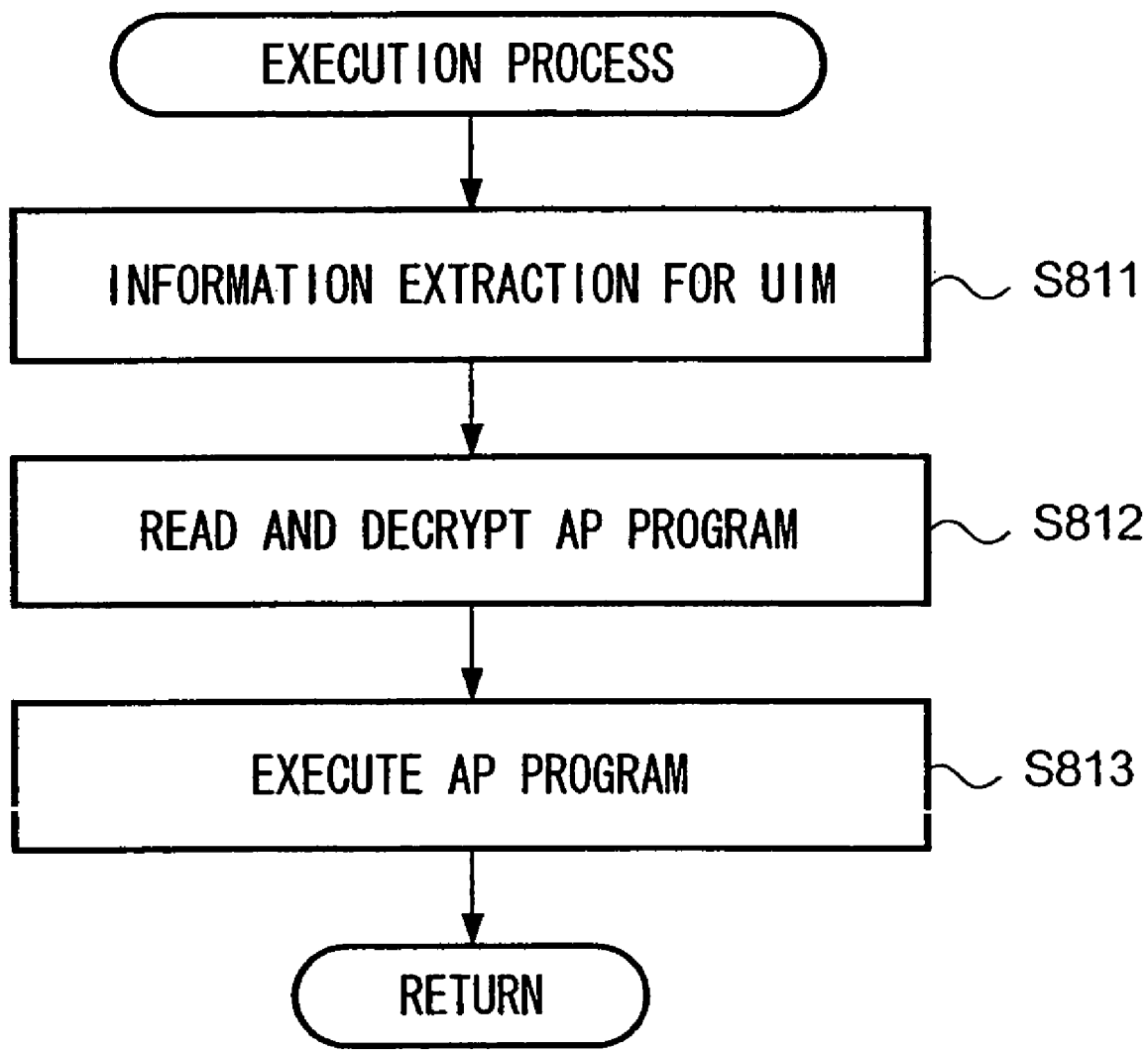
FIG. 14 is a block diagram showing the flow of the execution process in mobile station 80.

When subscriber SB attempts to execute AP program PB downloaded to mobile station 80, the execution process shown in FIG. 14 is carried out. Namely, CPU 83 of mobile station 80 first carries out the UIM information extraction process (S811) for UIM 20B1. In this process, the contract identification information corresponding to UIM 20B1 is extracted. Then, CPU 83 carries out the decryption (S812) using an encryption key corresponding to the contract identification information for AP program PB read from EEPROM 81. Both the encryption key used when encrypting AP program PB and that used when decrypting the AP program PB correspond to the contract identification information stored in UIM 20B1. Namely, they are congruent. Therefore, AP program PB is correctly decrypted by the above decryption process. Finally, CPU 83 is able to successfully execute the decrypted AP program PB(S813), because it has been decrypted correctly.

When subscriber SB enters an instruction for executing AP program PA stored in EEPROM 81, a process similar to the execution process of AP program PB is carried out. In this case, the encryption key for encrypting AP program PA corresponds to the contract identification information stored in UIM 20A, while the encryption key for decrypting the AP program PA corresponds to UIM 20B1. Namely, the two encryption keys are not congruent. Therefore, AP program PA is not executed correctly.

(2-4) Backup Process of AP Program with UIM 20B1

When subscriber SB attempts to output the downloaded AP program from mobile station 80 to PC 70 existing outside mobile station 80 for backup, AP programs PA and PB are read from EEPROM 81 by CPU 83 of mobile station 80, and are then output to PC 70. The outputted AP programs PA and PB are received and stored by PC 70. Note that it is impossible to decrypt the AP programs PA and PB, because the contract identification information necessary for decrypting the AP programs is at no time output outside mobile station 80.

(2-5) Various Operations with UIM 20B2

When subscriber SB obtains a new UIM 20B2 because of a malfunction or the like, without interruption to his (her) subscription contract, first, a process similar to that in the first embodiment is carried out and then the certification information in accordance with UIM 20B2 is stored in UIM 20B2. The certification information is not congruent with the certification information stored in UIM 20B1, but the contract identification information stored in UIM 20B2 is congruent with the contract identification information stored in UIM 20B1.

When subscriber SB attempts to execute AP program PB in mobile station 80, an execution process similar to the above-described execution process is carried out not for UIM 20B1, but UIM 20B2. Consequently, AP program PB is executed correctly in mobile station 80. When subscriber SB attempts to output AP program PB stored in EEPROM 36 of mobile station 80 outside mobile station 80, an output process similar to the above-described output process is carried out not for UIM 20B1, but UIM 20B2. Consequently, the encrypted AP program PB is outputted to PC 70. Namely, subscriber SB can execute or output AP program PB in the same way as when UIM 20B1 is mounted to mobile station 80.

[3] Effect of the Embodiments

As described above, according to the preferred embodiments of the present invention, a user can execute or output an AP program correctly only by using a UIM corresponding to the same contract identification information as that of the UIM which is mounted to the mobile station at the time of downloading the AP program from IP server 10 to the mobile station.

According to the preferred embodiments of the present invention, it is impossible to execute the AP program outside the mobile station because the AP program is encrypted by information which is at no time output from the mobile station.

Therefore, usage of the AP program beyond the range permitted by the copyright holder of the AP program can be prevented.

According to the preferred embodiments of the present invention, the contract identification information is transmitted via a secure communication route. The contract identification information is distributed after being encrypted by use of an encryption key of the communication carrier serving the communication route. It is impossible to rewrite the UIM identification information of a UIM. Accordingly, high-level security can be ensured in the preferred embodiments of the present invention.

According to the preferred embodiments of the present invention, a subscriber can store his (her) contract identification information by operating his (her) mobile station. Namely, it is not necessary for the subscriber to visit an outlet for mobile stations or UIMs to store the contract identification information.

In the preferred embodiments of the present invention, the contract identification information is distributed via the mobile packet communication network by the communication carrier serving the mobile packet communication network, via which an AP program is distributed to a mobile station. These embodiments are preferable for business use, as the communication carrier may employ a third party to collect charges for AP programs distributed to the mobile station.

According to the first embodiment of the present invention, the AP program is stored without being encrypted. Accordingly, it is not necessary to decrypt the AP program when executing the AP program. This is an advantage in a mobile station, which has lower calculation power than a PC.

According to the second embodiment of the present invention, it is not necessary to use the restriction table. Accordingly, the process corresponding to the restriction table can be omitted. It is also not necessary to encrypt the AP program when outputting it. This is an advantage especially in a case that one AP program is outputted many times.

[4] Modifications

The storage process of contract identification information in a UIM may be initiated by switching on the power supply or registering a location of the mobile station, instead of by operation by the user. The contract identification information may be stored only when it is determined as a result of a search for the contract identification information of the UIM by the mobile station that the contract identification information has not been stored yet. Further, the server device may send the contract identification information at predetermined time intervals to a UIM which has not stored the contract identification information.

Although the distribution and request of contract identification information are carried out via a communication network in the above-described embodiments, this does not restrict the technical scope of the present invention. For example, the UIM identification information of a newly-purchased UIM may be transmitted from the retail outlet selling the UIM, to server device 60, and corresponding contract identification information may also be transmitted from server device 60 to a mobile station having a UIM mounted thereto, via a communication network. Alternatively, for example, contract identification information may be pre-stored in a UIM.

Although distribution of an AP program is restricted in the above-described embodiments, the technical scope of the present invention is not restricted by the examples. Content which has been pre-stored in a mobile station may be restricted. In this embodiment, a process similar to the download process of an AP program in the preferred embodiments is carried out before or when purchasing the mobile station.

In the preferred embodiments, server device 60 is described as a single device, but the features of server device 60 may be available to a plurality of devices. For example, a device for relaying communication data and a device for issuing certification information (assisting with obtaining authorization) may be substituted for server device 60. A device for authorizing and a device for requesting an authorization may further be substituted for the latter device.

Although the IP server device is connected to server device 60 via the Internet in the above-described embodiments, the IP server may be connected to server device 60 via a common carrier-leased line, or server device 60 itself may distribute the requested content. Namely, it is not necessary for server device 60 to be connected to the Internet.

Although an AP program to be downloaded is identified by using a URL in the above-described embodiments, any identification information capable of uniquely identifying a resource may be used for identifying the AP program. The identification information may include URI (Uniform Resource Identifier). Of course, an AP program may be identified by a combination of the information showing the destination address of the request message for download and the information for identifying the AP program at the destination.

Although the public key of the communication carrier which serves the mobile packet communication network is stored in the mobile station and the certification information is decrypted by using the public key in the above-described embodiments, the public key may be stored in the UIM and the certification information be decrypted by use of this public key. In this case, it is not necessary for the mobile station to store the public key.

The user authorization by UIM or by the mobile packet communication network, or the mobile station authorization or the UIM authorization by the mobile packet communication network may be combined with the above-described embodiments. This modification allows unauthorized usage to be prevented with greater certainty.

Although communication between a UIM and server device 60 is terminated by the mobile station in the above-described embodiments, communication between a UIM and server device 60 may be secure End-to-End communication. The certification information may be downloaded to the UIM via such an End-to-End communication route.

Although encryption of the AP program is carried out in the mobile station, encryption of the AP program may be carried out by the IP server device by use of the contract identification information transmitted from the mobile station to the IP server device. Then, the encrypted AP program may be transmitted to the mobile station. In this modification, the encryption of the AP program may be carried out by server device 60. This modification enables prevention of transmission of the contract identification information (namely, personal information) to the Internet.

Although in the second embodiment the encryption key used when encrypting the content corresponds to the contract identification information stored in the UIM mounted to the mobile station at that time, the technical scope of the present invention is not restricted to this. For example, the following processes (1-A) and (1-B)-(3-A) and (3-B) may be carried out in order. Note that the execution order of (1-A) and (1-B) is arbitrary and that it may be possible to carry out one only of (3-A) and (3-B).

(1-A) A first encryption key for encrypting a content is generated freely in the mobile station. The AP program is encrypted by use of the first encryption key.

(1-B) A second encryption key is generated by using the contract identification information stored in the UIM mounted to the mobile station and a rule for generating an encryption key based on the contract identification information. The first key is encrypted by using the second encryption key.

(2) The encrypted AP program is stored with the encrypted first encryption key.

(3-A) During execution of the AP program, the first encryption key stored with the encrypted AP program is decrypted by use of the contract identification information stored in the UIM mounted to the mobile station and the above-described rule for generating an encryption key. The AP program is decrypted by using the decrypted first encryption key, and then the decrypted AP program is executed.

(3-B) When outputting the AP program, the mobile station outputs the encrypted AP program and the encrypted first encryption key stored with the AP program.

According to this embodiment, if the contract identification information is leaked, it is impossible to execute the encrypted AP program because the rule for generating the encryption key which is necessary for decrypting the first encryption key is secret. This embodiment further has the advantage that the key space of the second encryption key is not limited because the second encryption key is generated freely.

Although a PC is shown as an example of a device for backup AP programs in the above-described embodiments, the technical scope of the present invention is not thus restricted. Any device capable of communicating to a mobile station and storing information may be used as a device for backup AP programs.

Although the usage restriction is applied to AP programs in the above-described embodiments, the usage restriction may be applied for any content, for example, image data or music data.

Although execution and output are shown as examples of "usage" in the above-described embodiments, of course the type of usage is modified in response to the kind of content to be restricted, for example, "display" for image data or "play" for music data.

Although a mobile station is shown as an example of a device for restricting content usage in the above-described embodiments, the technical scope of the present invention is not thus restricted. Any communication device which can receive and store content whose usage should be restricted, may be substituted for the mobile station in the above-described embodiments.

Although the contract identification information is included in the certification information in the above-described embodiments, any data encrypted by the secret key of the communication carrier may be substituted for the certification information in the above-described embodiments. The encryption rule may be modified according to a required security level for the system.

Although a mobile packet communication network is used in the above-described embodiments, a circuit switching network or a fixed network may be substituted for the mobile packet communication network in the above-described embodiments.

Although the mobile station and the UIM communicate with each other by wired communication in the above-described embodiments, the mobile station and the UIM may communicate with each other by wireless communication.

Although the contract identification information is stored in the UIM in the above-described embodiments, the contract identification information may be stored in another storage medium such as a memory card. Note that the storage medium is required to store the identification information for uniquely identifying the storage medium.

[5] Effect of the Present Invention

As described above, the present invention allows a communication device to identify a subscriber who attempts to use a communication device, because the contract identification information stored in the storage medium capable of communicating with the communication device corresponds to the communication device.

The invention claimed is:

1. A server device, comprising:
a memory configured to store contract identification information in association with medium identification information, the contract identification information comprising identification of a subscription contract between a subscriber to a wireless communication service and a communication carrier providing the wireless communication service, the medium identification information comprising identification of a storage medium of the subscriber, issued in accordance with the subscription contract, and configured to be accessible with a communication apparatus capable of communication via the wireless communication service;
a communication unit configured to receive the medium identification information transmittable with the communication apparatus; and
a processor configured to extract, from the memory, contract identification information that corresponds to the received medium identification information;
the communication unit further configured to transmit the extracted contract identification information for receipt and storage by the communication apparatus in the storage medium identified by the medium identification information.

2. A server device according to claim 1, wherein:
the communication unit is further configured to transmit the contract identification information via a wireless communication network served by the communication carrier; and
the wireless communication network is configured to transmit information for receipt by the communication apparatus only if the communication apparatus is authorized to receive the wireless communication service.

3. A server device according to claim 1, wherein the communication unit is configured to receive the contract identification information transmittable from the communication apparatus over the communication network served by the communication carrier.

4. A server device according to claim 1, wherein:
the processor is further configured to encrypt the extracted contract identification information based on a secret key of the communication carrier prior to transmission for receipt and storage in the storage medium identified by the medium identification information.

5. A server device according to claim 1, wherein the communication apparatus is configured to access the storage medium and extract the medium identification information transmittable to the communication unit, the communication apparatus further configured to store received contract identification information in the storage medium from which the medium identification information was extracted.

6. A server device according to claim 1, wherein the storage medium is a universal identity module owned by the user and configured to be mounted on the communication apparatus operated by the user.

7. A server device according to claim 1, wherein the communication unit is configured to receive a request message to request transmittal of subscription contract information that includes the medium identification information, and the contract identification information includes certification that the storage medium identified with the received medium identification information is certified by the subscription contract.

8. A communication apparatus comprising:
a processor configured to extract medium identification information from a storage medium that is issued to a subscriber to a communication service based on a subscription contract, the subscription contract is between the subscriber to the communication service and a communication carrier providing the communication service, the storage medium configured to be accessible by the processor; and
a mobile communication unit in communication with the processor, the mobile communication unit configured to transmit the extracted medium identification information for receipt by a server device,
the mobile communication unit further configured to receive from the server device, responsive to the transmitted medium identification information, contract identification information of the subscription contract associated with the transmitted medium identification information;
the processor further configured to store the received contract identification information in the storage medium from which the medium identification information was extracted.

9. A communication apparatus according to claim 8, further comprising a memory and an input unit in communication with the processor, wherein the mobile communication unit is further configured to receive a content;
the processor further configured to store the received content in the memory in association with the contract identification information, and the input unit is configured to receive an instruction to execute the received content;
the processor, in response to the instruction, further configured to extract the contract identification information from the storage medium, and further configured to restrict execution of the content to only when the contract identification information extracted from the storage medium, and the contract identification information stored in the memory in association with the received content match.

10. A communication apparatus according to claim 8, further comprising a memory in communication with the processor, wherein:
the mobile communication unit is further configured to receive a content, and the processor is further configured to encrypt the received content based on the contract identification information stored in the storage medium; and
the memory is configured to store the encrypted content.

11. A communication apparatus according to claim 8, further comprising a memory in communication with the processor, wherein:
the mobile communication unit is further configured to receive a content;
the processor is further configured to encrypt the content based on a first encryption key generated in response to receipt of the content by the mobile communication unit, and to encrypt the first encryption key based on a second encryption key, generation of the second encryption key based on the contract identification information that corresponds to the received content and a predetermined encryption key generation rule; and
the memory is configured to store the encrypted content and the encrypted first encryption key.

12. A communication apparatus according to claim 10, wherein:
the processor is further configured to extract the contract identification information from the storage medium in response to the content stored in the memory being executed, and the processor is further configured to decrypt the encrypted content based on the extracted contract identification information.

13. A communication apparatus according to claim 11, wherein:
the processor is further configured to extract the contract identification information from the storage medium when the content stored in the memory is executed, and the processor further configured to decrypt the encrypted content based on the extracted contract identification information.

14. A communication apparatus according to claim 8, further comprising an input unit in communication with the processor and configured to receive user inputs, and the processor configured to extract medium identification information in response to a signal representative of a manual user input received from the input unit.

15. A communication apparatus according to claim 8, wherein the processor is configured to extract medium identification information in response to application of power to the processor and the storage medium.

16. A computer readable storage medium storing a program executable with a computer, comprising:
program instructions to store contract identification information in association with medium identification information, the contract identification information comprising identification of a subscription contract between a subscriber to a communication service and a communication carrier providing the service, the medium identification information comprising identification of a storage medium issued to the subscriber based on the subscription contract and configured to be accessed with a communication apparatus capable of communication via the communication service;
program instructions to receive, from the communication apparatus, a request message that includes the medium identification information;
program instructions to extract the contract identification information associated with the received medium identification information in response to the request message; and
program instructions to transmit the extracted contract identification information for receipt by the communication apparatus, and storage of the contract identification information in the storage medium.

17. The computer readable storage medium of claim 16, further comprising program instructions to verify that the communication apparatus is authorized to receive transmissions via a communication network served by the communication carrier.

18. The computer readable storage medium of claim 16, wherein the program instructions to transmit the extracted contract identification information further comprise program instructions to encrypt the extracted contract identification information to be transmitted to the communication apparatus.

19. A computer readable storage medium storing a program that is executable by a computer, comprising:
program instructions to extract medium identification information from a storage medium issued to a subscriber to a communication service based on a subscription contract between the subscriber to the communication service and a communication carrier providing the service, the storage medium configured to store unique medium identification information and further configured to communicate with a communication apparatus;
program instructions to transmit the extracted medium identification information with the communication apparatus for receipt by a server device;
program instructions to receive with the communication apparatus contract identification information transmitted from the server device in response to the medium identification information, the subscription contract uniquely identified with the contract identification information based on the medium identification information of the storage medium; and
program instructions to store the received contract identification information in the storage medium from which the medium identification information was extracted.

20. The computer readable storage medium of claim 19, further comprising:
program instructions to request content;
program instructions to receive the content;
program instructions to store the received content and the contract identification information in a memory, the content stored in the memory in association with the contract identification information.

21. The computer readable storage medium of claim 20, further comprising program instructions to receive a request for execution of the content, program instructions to compare the contract identification information stored in the memory with the contract identification information stored in the storage medium, and program instructions to execute the content only in response to a match.

22. The computer readable storage medium of claim 19, further comprising:
program instructions to request content;
program instructions to receive the content;
program instructions to encrypt the received content based on a first encryption key generated in accordance with the contract identification information stored in the storage medium.

23. The computer readable storage medium of claim 22, further comprising:
program instructions to generate a second encryption key based on both the received contract identification information that corresponds to the received content and a predetermined encryption key generation rule;
program instructions to encrypt the first encryption key based on the second encryption key; and
program instructions to store the encrypted content and the encrypted first encryption key in a memory.

* * * * *